US009950484B2

(12) United States Patent
Sakaguchi

(10) Patent No.: US 9,950,484 B2
(45) Date of Patent: Apr. 24, 2018

(54) MANUFACTURING METHOD OF FINITE CONVEYOR BELT, JOINING METHOD OF FINITE CONVEYOR BELT, MANUFACTURING METHOD OF ENDLESS CONVEYOR BELT, AND CONVEYOR BELT APPARATUS

(71) Applicant: BRIDGESTONE CORPORATION, Tokyo (JP)

(72) Inventor: Toshiki Sakaguchi, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 234 days.

(21) Appl. No.: 14/770,314

(22) PCT Filed: Jan. 31, 2014

(86) PCT No.: PCT/JP2014/052259
§ 371 (c)(1),
(2) Date: Aug. 25, 2015

(87) PCT Pub. No.: WO2014/132743
PCT Pub. Date: Sep. 4, 2014

(65) Prior Publication Data
US 2016/0001512 A1 Jan. 7, 2016

(30) Foreign Application Priority Data
Feb. 27, 2013 (JP) .................. 2013-037259
Mar. 13, 2013 (JP) .................. 2013-050482

(51) Int. Cl.
*B29D 29/06* (2006.01)
*B65G 15/34* (2006.01)
(52) U.S. Cl.
CPC .............. *B29D 29/06* (2013.01); *B65G 15/34* (2013.01)

(58) Field of Classification Search
None
See application file for complete search history.

(56) References Cited

U.S. PATENT DOCUMENTS 5,552,005 A    9/1996  Mammino et al.
6,328,840 B1 * 12/2001 Takano ............ B29C 66/73941
                                                                 156/137
(Continued)

FOREIGN PATENT DOCUMENTS

JP    2003-118005 A  *  4/2003
JP    2006-258478 A      9/2006
(Continued)

OTHER PUBLICATIONS

Machine translation of Japanese Patent 2003-118005, date unknown.*

(Continued)

*Primary Examiner* — Jeffry H Aftergut
(74) *Attorney, Agent, or Firm* — Sughrue Mion, PLLC

(57) ABSTRACT

A manufacturing method of a finite conveyor belt of the present invention includes a laminated body formation step of forming a laminated body (35) in which a core layer member (32) which includes a tensile body (14) is interposed between an unvulcanized top cover rubber member (33) and an unvulcanized bottom cover rubber member (34) in a belt thickness direction T, and a vulcanization step of vulcanizing the laminated body (35) by pressurizing in the belt thickness direction (T) and heating the laminated body to form a finite conveyor belt, and the laminated body formation step includes a member formation step of forming the top cover rubber member (33) by separately connecting both ends of an unvulcanized first cover rubber part (36) in a belt length direction (L) in which a detection object (15)

(Continued)

is embedded with ends of an unvulcanized second cover rubber parts (37) in the belt length direction (L).

9 Claims, 9 Drawing Sheets

(56) References Cited

U.S. PATENT DOCUMENTS

| | | | |
|---|---|---|---|
| 2006/0219528 A1 | 10/2006 | Aizawa et al. | |
| 2007/0295432 A1* | 12/2007 | Posada | B29D 30/3007 |
| | | | 152/154.2 |
| 2009/0145730 A1 | 6/2009 | Aizawa et al. | |
| 2009/0266684 A1* | 10/2009 | Nishikita | B65G 43/02 |
| | | | 198/810.02 |
| 2010/0182001 A1* | 7/2010 | Furukawa | B65G 43/02 |
| | | | 324/241 |

FOREIGN PATENT DOCUMENTS

| | | |
|---|---|---|
| JP | 2006-315858 A | 11/2006 |
| JP | 2009-222469 A | 10/2009 |
| JP | 5073496 B2 | 11/2012 |
| JP | 5693464 B2 | 4/2015 |
| WO | 2005/005292 A1 | 1/2005 |
| WO | 2007/029698 A1 | 3/2007 |
| WO | WO-2007/029698 A1 * | 3/2007 |
| WO | 2009/028667 A1 | 3/2009 |
| WO | WO-2011/058755 A1 * | 5/2011 |

OTHER PUBLICATIONS

International Search Report of PCT/JP2014/052259 dated Mar. 11, 2014 [PCT/ISA/210] English Translation.

* cited by examiner

US 9,950,484 B2

MANUFACTURING METHOD OF FINITE CONVEYOR BELT, JOINING METHOD OF FINITE CONVEYOR BELT, MANUFACTURING METHOD OF ENDLESS CONVEYOR BELT, AND CONVEYOR BELT APPARATUS

CROSS REFERENCE TO RELATED APPLICATIONS

This application is a National Stage of International Application No. PCT/JP2014/052259, filed Jan. 31, 2014, claiming priorities based on Japanese Patent Application No. 2013-037259, filed Feb. 27, 2013 and Japanese Patent Application No. 2013-050482, filed Mar. 13, 2013 the contents of all of which are incorporated herein by reference in their entirety.

TECHNICAL FIELD

The present invention relates to a manufacturing method of a finite conveyor belt, a joining method of a finite conveyor belt, a manufacturing method of an endless conveyor belt, and a conveyor belt apparatus.

BACKGROUND ART

A manufacturing method of an endless conveyor belt for forming an endless conveyor belt which includes an endless cover rubber part in which a tensile body (core) is embedded by joining both ends of a finite conveyor belt in a belt length direction which includes a finite cover rubber part in which a tensile body is embedded has been known in the related art. First in this method, an exposure step of exposing the tensile body is performed for the ends of the finite conveyor belt in the belt length direction. Then, in a state in which the ends of the finite conveyor belt in the belt length direction are superimposed and the tensile body exposed at the ends is disposed in an unvulcanized joining rubber member, a joining step of joining the ends of the finite conveyor belt in the belt length direction is performed by pressurizing in the belt thickness direction and heating the joining rubber member to be vulcanized.

In this manufacturing method of an endless conveyor belt, the joining rubber member is set to be thicker than the finite cover rubber part so that only the joining rubber member between the finite cover rubber part and the joining rubber portion is pressurized in the belt thickness direction and vulcanized. As a result, in the endless cover rubber part, a main body portion formed with the finite cover rubber part and a joint portion formed with the joining rubber member have different thicknesses.

As a conveyor belt apparatus which includes this type of endless conveyor belt, a configuration which includes an endless conveyor belt and a detection processing means as disclosed in, for example, Patent Document 1 mentioned below is known. This endless conveyor belt further includes a detection object. This detection object is embedded in a portion of the endless cover rubber part positioned on a front surface side of the endless cover rubber part rather than on the tensile body side. The detection object is abraded according to an amount of abrasion of the front surface of the endless cover rubber part. The detection processing means detects the detection object, and obtains an amount of abrasion of the front surface of the endless cover rubber part based on the result of the detection.

CITATION LIST

Patent Document

[Patent Document 1]
PCT International Publication No. WO 2007/029698

SUMMARY OF INVENTION

Technical Problem

Here, as a method for forming an endless conveyor belt with a detection object embedded in an endless top cover rubber part as described above, a method of embedding a detection object in a joining rubber member in the manufacturing method of an endless conveyor belt described above is considered.

However, since the detection object is embedded in a joining portion having a different thickness from that of a main body portion of the endless top cover rubber part in this case, although an amount of abrasion of the joining portion, which takes up a relatively narrower range than the main body portion, can be obtained, it is difficult to obtain an amount of abrasion of the main body portion in the conveyor belt apparatus with high accuracy.

The present invention takes the above-described circumstances into account, and aims to provide a manufacturing method of an endless conveyor belt which can obtain an amount of abrasion of a main body portion of an endless top cover rubber part with high accuracy.

Solution to Problem

In order to solve the problem, the present invention proposes the following measures.

A manufacturing method of a finite conveyor belt according to the present invention is a manufacturing method of a finite conveyor belt in which, in a finite top cover rubber part in which a tensile body is embedded, a detection object which is abraded according to an amount of abrasion of a surface of the finite top cover rubber part is embedded in a portion positioned on the top surface side rather than on the tensile body side, and which includes a laminated body formation step of forming a laminated body in which a core layer member which includes the tensile body is interposed between an unvulcanized top cover rubber member and an unvulcanized bottom cover rubber member in a belt thickness direction, and a vulcanization step of vulcanizing the laminated body by pressurizing in the belt thickness direction and heating the laminated body to form the finite conveyor belt, and the laminated body formation step includes a member formation step of forming the top cover rubber member by separately connecting both ends of an unvulcanized first cover rubber part in a belt length direction in which the detection object is embedded with ends of unvulcanized second cover rubber parts in the belt length direction.

In addition, a joining method of a finite conveyor belt according to the present invention is a joining method of a finite conveyor belt for joining ends of a finite conveyor belt manufactured using the manufacturing method of a finite conveyor belt in a belt length direction, the method including an exposure step of causing the tensile body to be exposed at the ends of the finite conveyor belt in the belt length direction; and a joining step of vulcanizing an unvulcanized joining rubber member by pressurizing in a belt thickness direction and heating the joining rubber member in a state in which the ends of the finite conveyor belt in the belt length direction are superimposed and the tensile body exposed at the ends is disposed inside the joining rubber member.

In addition, a manufacturing method of an endless conveyor belt according to the present invention is a manufacturing method of an endless conveyor belt in which, in an endless top cover rubber part in which a tensile body is embedded, a detection object which is abraded according to an amount of abrasion of a surface of the endless top cover rubber part is embedded in a portion positioned on the top surface side rather than on the tensile body side, in which the endless conveyor belt is formed by joining ends of the finite conveyor belt in a belt length direction to each other using the joining method of a finite conveyor belt.

In addition, a conveyor belt apparatus according to the present invention includes an endless conveyor belt manufactured using the manufacturing method of an endless conveyor belt, and a detection processing means which detects the detection object and obtains an amount of abrasion of a surface of the endless top cover rubber part based on a result of the detection.

According to the invention, a top cover rubber member is formed by separately connecting both ends of the unvulcanized first cover rubber part in the belt length direction with the ends of the unvulcanized second cover rubber parts during the member formation step. Thus, by vulcanizing the laminated body by pressurizing in the belt thickness direction and heating the laminated body which includes this top cover rubber member during the vulcanization step, the detection object can be embedded in the finite top cover rubber part, rather than in the joining rubber member.

Thus, by detecting the detection object and thereby obtaining an amount of abrasion of the top of the endless top cover rubber part based on a result of the detection using the detection processing means, an amount of abrasion of a main body portion of the endless top cover rubber part can be obtained with high accuracy.

In addition, since the detection object can be embedded in the finite top cover rubber part rather than in the joining rubber member as described above, a shape of the joining rubber member can be designed regardless of a shape of the detection object. Accordingly, the joining rubber member can be designed to be a shape which enables easy vulcanization while, for example, the detection object can be shaped to be easily detected by the detection processing means.

In addition, in the manufacturing method of a finite conveyor belt according to the present invention, by disposing the second cover rubber parts on the core layer member while connecting the ends of the first cover rubber part in the belt length direction which has been disposed on the core layer member with the ends of the second cover rubber parts in the belt length direction during the member formation step, the top cover rubber member may be formed on the core layer member.

In this case, by disposing the second cover rubber parts on the core layer member while connecting the ends of the first cover rubber part in the belt length direction which has been disposed on the core layer member with the ends of the second cover rubber parts in the belt length direction during the member formation step, the top cover rubber member is formed on the core layer member.

Thus, the second cover rubber parts can be easily disposed on the core layer member while their positions with respect to the first cover rubber part are adjusted with high accuracy, and thereby the finite conveyor belt can be manufactured with high accuracy.

In addition, in the manufacturing method of a finite conveyor belt according to the present invention, the first cover rubber part may be formed in a staircase shape in which stairs gradually ascend from the outer side to the inner side of the belt length direction as they lead from the core layer member side to the surface of the top cover rubber in the belt thickness direction, the second cover rubber parts may each include a plurality of top rubber sheets laminated in the belt thickness direction, a thickness of each of the top rubber sheets may equal to the size of each stair in the belt thickness direction at an end of the first rubber cover in the belt length direction, and the second cover rubber parts may be disposed on the core layer member by laminating the top rubber sheets on the core layer member while connecting the ends of the top rubber sheets in the belt length direction with stair end faces facing the belt length direction at the ends of the first cover rubber part in the belt length direction during the member formation step.

In this case, by laminating the top rubber sheets on the core layer member while connecting the ends of the top rubber sheets in the belt length direction with the stair end faces of the first cover rubber part in the belt length direction during the member formation step, the second cover rubber parts are disposed on the core layer member. Thus, the top rubber sheets can be easily laminated on the core layer member while their positions with respect to the first cover rubber part are adjusted with high accuracy, and a finite conveyor belt can be manufactured with higher accuracy.

In addition, in the manufacturing method of a finite conveyor belt according to the present invention, the top cover rubber member may be formed by disposing the first cover rubber part in a disposition space which is provided between the second cover rubber parts that are disposed on the core layer member neighboring each other in the belt length direction while connecting the ends of the first cover rubber part in the belt length direction with the ends of the second cover rubber parts in the belt length direction during the member formation step.

In this case, by disposing the first cover rubber part in the disposition space while connecting the ends of the first cover rubber part in the belt length direction with the ends of the second cover rubber parts in the belt length direction during the member formation step, the top cover rubber member is formed. Thus, the first cover rubber part can be easily disposed on the core layer member while its position with respect to the second cover rubber parts is adjusted with high accuracy, and a finite conveyor belt can be manufactured with high accuracy.

In addition, in the manufacturing method of a finite conveyor belt according to the present invention, the second cover rubber parts and the disposition space may be formed on the core layer member by removing part of the unvulcanized second cover rubber parts disposed on the core layer member during the member formation step.

In this case, since the second cover rubber parts and the disposition space are formed on the core layer member by removing a part of the second cover rubber parts disposed on the core layer member during the member formation step, the second cover rubber parts and the disposition space can be easily formed.

Advantageous Effects of Invention

According to the present invention, an amount of abrasion of a main body portion of an endless top cover rubber part can be obtained with high accuracy.

DESCRIPTION OF EMBODIMENTS

First Embodiment

A conveyor belt apparatus according to a first embodiment of the present invention will be described below with reference to the drawings.

As illustrated in FIGS. 1 to 4, the conveyor belt apparatus 10 includes an endless conveyor belt 11 and a detection processing means 12.

Figure 2:
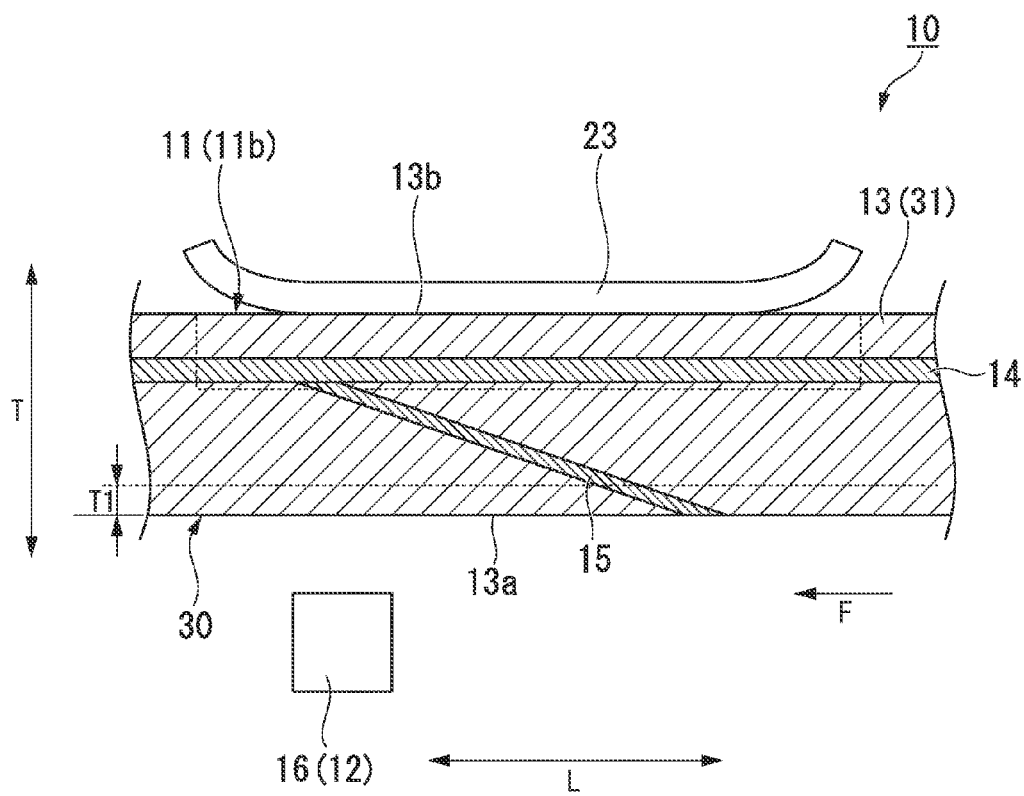
FIG. 2 is an enlarged cross-sectional view of the A part shown in FIG. 1.

The endless conveyor belt 11 includes an endless top cover rubber part 13, a tensile body 14, and a detection object 15. A conveyance object is placed on a top 13a of the endless top cover rubber part 13. The tensile body 14 extends in a belt length direction and is embedded in the endless top cover rubber part 13 as illustrated in FIG. 2. The tensile body 14 extends throughout the entire circumference of the endless top cover rubber part 13. The tensile body 14 extends in parallel with a bottom 13b of the endless top cover rubber part 13. The tensile body 14 is formed with a plurality of steel cords arranged in a belt width direction W. Surfaces of the steel cords are subjected to surface treatment, for example, galvanization, brass plating, or the like.

The detection object 15 is embedded in a portion of the endless top cover rubber part 13 positioned on the top 13a side of the endless top cover rubber part 13 rather than on the tensile body 14 side. The detection object 15 is abraded according to an amount of abrasion T1 of the top 13a of the endless top cover rubber part 13. The detection object 15 is magnetized in a plate-thickness direction and is formed of a plate-like magnet of which front and bottoms face the belt thickness direction T. In a side view of this conveyor belt 11 taken from the belt width direction W, the detection object 15 is oblique to the bottom 13b of the endless top cover rubber part 13.

The detection object 15 extends from the bottom 13b side of the endless top cover rubber part 13 toward the top 13a side in the belt thickness direction T little by little as the belt extends from one side to the other side in the belt length direction L. The detection object 15 linearly extends in the side view described above. One end of the detection object 15 positioned on one side in the belt length direction L is close to or comes in contact with the tensile body 14 from the top 13a in the belt thickness direction T. The other end of the detection object 15 positioned on the other side in the belt length direction L is exposed from the top 13a of the endless top cover rubber part 13 when the endless conveyor belt 11 starts being used.

The detection object 15 extends throughout the whole length of the endless top cover rubber part 13 in the belt width direction W, and is formed in a rectangular shape that is long in the belt width direction W in a planar view of the endless conveyor belt 11 taken from the belt thickness direction T. Therefore, detection of the detection object 15 by the detection processing means 12 is reliable.

The detection object 15 is formed of a rubber magnet. The rubber magnet is sufficiently pliable to be deformed along the endless conveyor belt 11. The rubber magnet is formed of, for example, a bond magnetic material which is obtained by dispersing a magnetic powder of a permanent magnet material in compounded rubber. As the magnetic powder, for example, a rare earth magnet, an Alcoa magnet, ferrite, or the like may be employed. As the rare earth magnet, for example, neodymium iron boron, samarium-iron-nitrogen, or the like may be employed.

In addition, it is preferable to have the rubber magnet vulcanized. When only the rubber magnet has been vulcanized before being embedded in a cover rubber part, the rubber material does not flow as easily as when it is vulcanized along with the rubber cover that has not been vulcanized, deterioration in expected performance can be suppressed, and desired performance can be assured.

Further, the rubber magnet preferably has a roughened surface. After the rubber magnet is embedded in the unvulcanized cover rubber part, a laminated body thereof is vulcanized, the rubber material of the cover rubber part can be caught on the roughened surface, and thus adhesion strength of the interface between the rubber magnet and the cover rubber part can be enhanced. Thus, separation of the interface of the rubber magnet and the cover rubber part can be prevented, and a conveyor belt that is sufficiently reliable to be continuously used over a long period of time without problem can be obtained. Furthermore, since performance of the rubber magnet can be sufficiently exhibited, high quality can be easily achieved.

As a preferable manufacturing method of a rubber magnet, specifically, a separable sheet having a roughened attachment surface is attached to a surface of an unvulcanized rubber magnet such that it can be separated, the rubber magnet with the separable sheet is vulcanized, then the separable sheet is separated, and thereby a vulcanized rubber magnet having a surface to which the roughness has been transferred can be obtained.

The separable sheet preferably has surface roughness Ra of the attachment surface of 1 to 5000 μm. In this case, adhesion strength between embedded rubber and a rubber belt can be more heightened. At that time, the surface roughness Ra is preferably 20 to 400 μm.

Note that, when the surface roughness Ra is lower than 1 μm and higher than 5000 μm, predetermined adhesion force is difficult to obtain, and sufficient adhesion performance of the interface between the rubber magnet and the cover rubber part is difficult to expect. In addition, the surface roughness means center-line average roughness $Ra_{75}$ as stipulated in JIS B0601.

In addition, it is preferable that the separable sheet be sailcloth. Sailcloth is used as a separable sheet in this case. Note that sailcloth refers to overall cloth such as heavy fabric and knitting, including non-woven fabric, and the like. A surface of such sailcloth is formed as a roughened surface on which convexities and concavities are regularly or irregularly formed by the warp and weft constituting a woven texture or a knitted texture. Thus, by using this sailcloth as a separable sheet, the convexities and concavities of the sailcloth surface can be transferred to the surface of the rubber magnet, and thus substantially uniform roughness can be easily formed on the entire surface. Therefore, substantially uniform adhesion force can be maintained over the entire interface between the rubber magnet and the cover rubber part.

Moreover, it is preferable that the sailcloth be coated with a separable material having a separation property from a rubber material such as a rubber magnet, or be impregnated with the separable material. In this case, after the rubber magnet is vulcanized, the sailcloth that is a separable sheet can be more easily separated from the adhesion surface.

Figure 1:
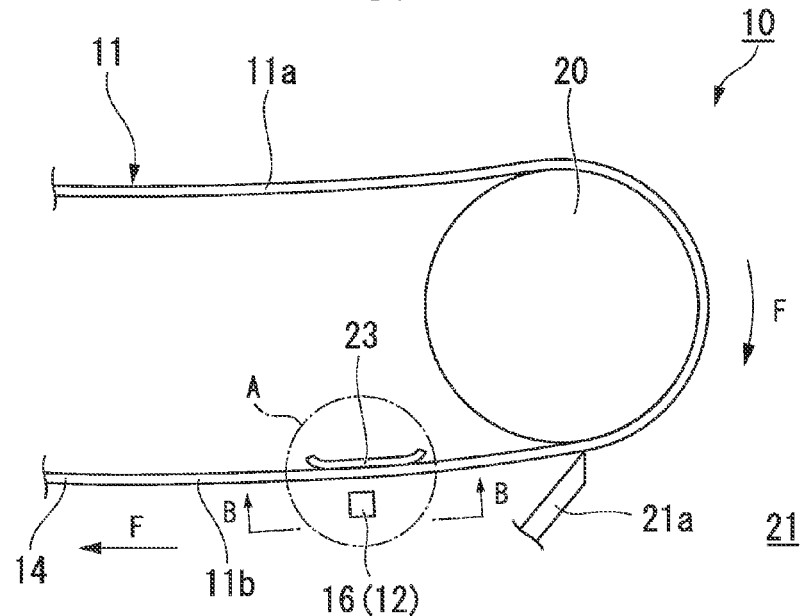
FIG. 1 is a side view illustrating a main part of a conveyor belt apparatus according to a first embodiment of the present invention.

As illustrated in FIG. 1, the endless conveyor belt 11 is wound between a pair of pulleys 20 which extend in the horizontal direction and can rotate about rotation axes. The endless conveyor belt 11 is caused to travel on one side in the belt length direction L by the pulleys 20, and one side of the belt length direction L is set as a front side F of the endless conveyor belt 11 of the travel direction. As the pulleys 20 move the endless conveyor belt 11 in the belt length direction L, a conveyance object placed on a carrier-side portion 11a of which a surface faces vertically upward in the endless conveyor belt 11 is conveyed. The endless conveyor belt 11 conveys the conveyance object to an unloading part 21 that is provided on one pulley 20 side of the pair of pulleys 20. The unloading part 21 is provided with a scraper 21a which scrapes the conveyance object off of the endless conveyor belt 11. Since the scraper 21a scrapes off the conveyance object placed on the carrier-side portion 11a, the conveyance object will have been removed in a return-side portion 11b of the endless conveyor belt 11, a surface of which faces vertically downward.

Note that the endless conveyor belt 11 may be configured to travel in a state in which the carrier-side portion 11a is supported in a trough shape, and to travel in a state in which the return-side portion 11b is flatly developed in the belt width direction W. In addition, the endless conveyor belt 11 may be configured to travel in a flat state throughout the entire circumference thereof. Further, at least one of the carrier-side portion 11a and the return-side portion 11b may be configured to travel in a state in which it is rounded about a pipe axis which extends in the belt length direction L.

Figure 3:
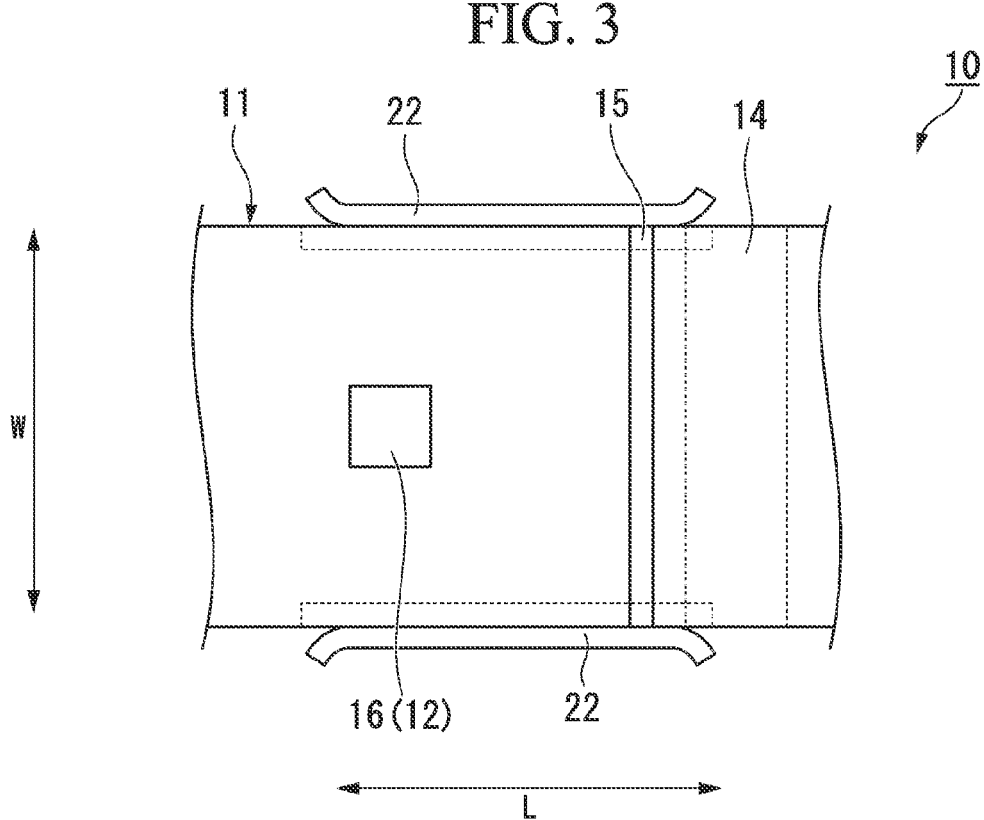
FIG. 3 is a view taken in the direction of the arrows B-B shown in FIG. 1.

As illustrated in FIGS. 1 to 3, in the belt route through which the return-side portion 11b of the endless conveyor belt 11 passes, a width-direction guide 22 and a thickness-direction guide 23 are provided at a return start position close to one of the pulleys 20. The width-direction guide 22 regulates a position of the return-side portion 11b of the endless conveyor belt 11 in the belt width direction W. The thickness-direction guide 23 supports the return-side portion 11b of the endless conveyor belt 11 from the bottom of the endless conveyor belt 11.

The detection processing means 12 detects the detection object 15, and obtains an amount of abrasion T1 of the top 13a of the endless top cover rubber part 13 based on a result of the detection. As illustrated in FIGS. 1 to 4, the detection processing means 12 includes a detection unit 16 and a processing unit 17.

The detection unit 16 detects the detection object 15 and transmits the result of the detection to the processing unit 17. The detection unit 16 is configured as a magnetic sensor and is constituted with, for example, a gauss meter, a loop coil, an MI sensor, an MR sensor, and the like. The detection unit 16 is disposed to face the top 13a of the endless top cover rubber part 13, and detects a magnetic field coming from the detection object 15. The detection unit 16 is disposed to face the surface of the return-side portion 11b of the endless conveyor belt 11. The detection unit 16 is disposed at the return start position.

Figure 4:
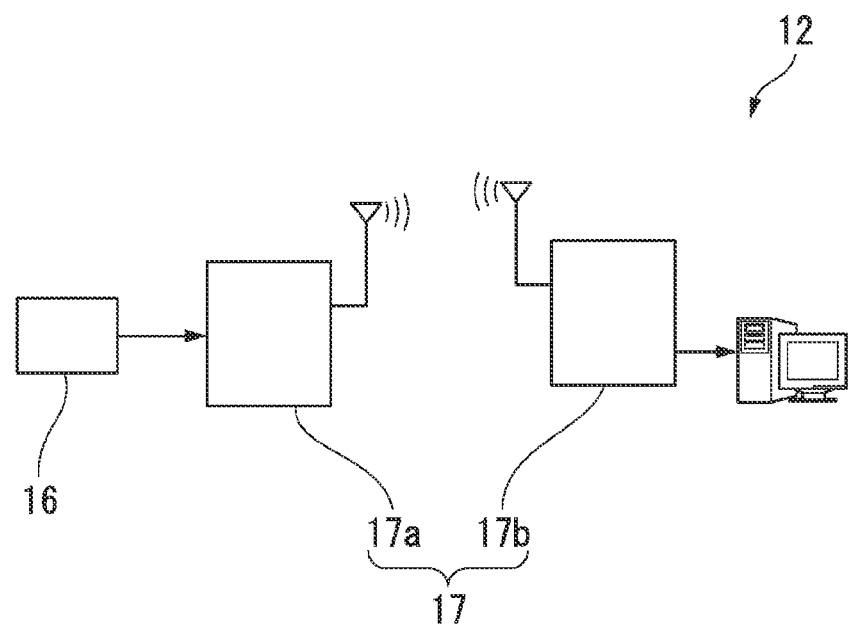
FIG. 4 is a block diagram of processing units constituting the conveyor belt apparatus shown in FIG. 1.

As shown in FIG. 4, the processing unit 17 obtains the amount of abrasion T1 of the top 13a of the endless top cover rubber part 13 based on a result of detection of the detection unit 16. The processing unit 17 includes a local computation control unit 17a and a central control unit 17b. The local computation control unit 17a receives input of a signal based on the result of the detection from the detection unit 16. The local computation control unit 17a computes the amount of abrasion T1 of the top 13a of the endless top cover rubber part 13 based on the signal, and transmits the result of the computation from a transmission unit. The central control unit 17b receives the signal transmitted from the transmission unit and outputs the result of the computation to an output terminal. When the amount of abrasion T1 exceeds a pre-set value, for example, the central control unit 17b issues an alarm, or stops travel of the endless conveyor belt 11.

As illustrated in FIG. 2, when the endless conveyor belt 11 is caused to travel in the belt length direction L in order to convey a conveyance object on the endless conveyor belt 11 in the conveyor belt apparatus 10, the top 13a of the endless top cover rubber part 13 is abraded. Then, since the detection object 15 is abraded from the other end of the detection object 15 according to the foregoing abrasion, the length of the detection object 15 in the belt length direction L decreases according to the amount of abrasion T1 of the top 13a of the endless top cover rubber part 13.

In addition, in the course of travel of the endless conveyor belt 11 in the belt length direction L in the conveyor belt apparatus 10, when the detection object 15 passes over the detection unit 16, the detection unit 16 consecutively detects the magnetic field coming from the detection object 15 throughout the whole length of the detection object 15 in the belt length direction L. Here, when the top 13a of the endless top cover rubber part 13 is abraded and the endless top cover rubber part 13 becomes thinner, the detection object 15 is abraded according to the foregoing abrasion as described above, and thus the length of the detection object 15 decreases in the belt length direction L according to the amount of abrasion T1 of the top 13a of the endless top cover rubber part 13. Accordingly, results of detection of the detection unit 16 change, and the processing unit 17 obtains the amount of abrasion T1 of the top 13a of the endless top cover rubber part 13 based on the results of the detection.

Note that detection of a magnetic field by the detection unit 16 may be performed each time the detection object 15 passes over the detection unit 16, or once in a plurality of passages.

The endless conveyor belt 11 is composed of a finite conveyor belt 30 which includes a finite top cover rubber part 31 in which the tensile body 14 is embedded. The endless conveyor belt 11 is formed by joining ends of one or a plurality of finite conveyor belts 30 in the belt length direction L. The endless conveyor belt 11 is formed by joining all ends of the finite conveyor belt 30 in the belt length direction L which are adjacent to each other in the belt length direction L.

Herein, a manufacturing method of a finite conveyor belt which is a method for forming the finite conveyor belt 30 will be described.

Figure 5:
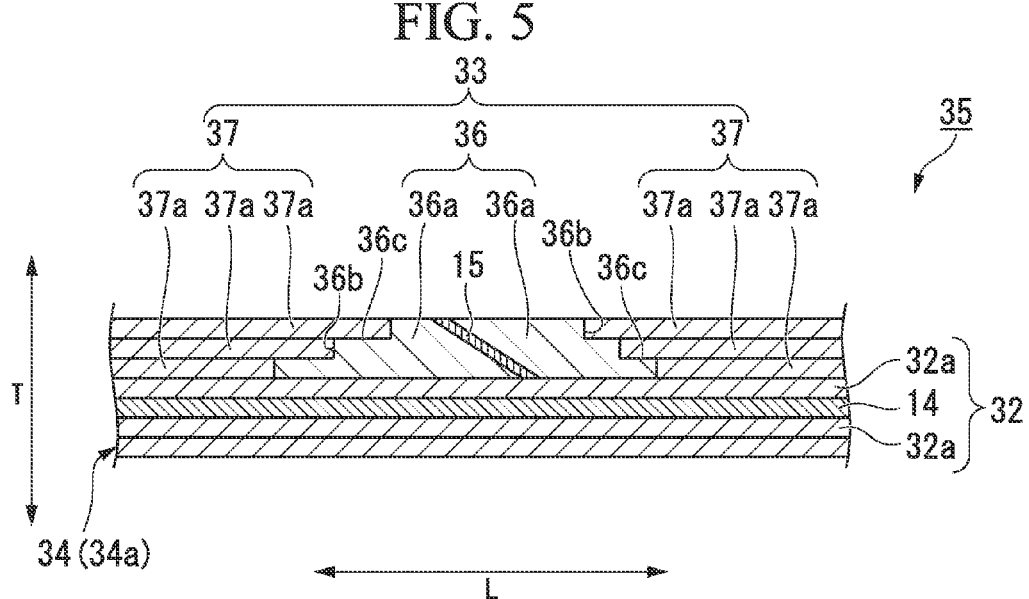
FIG. 5 is an illustrative diagram of a manufacturing method of a finite conveyor belt according to the first embodiment of the present invention.

In this method, first, a laminated body formation step of forming a laminated body 35 is executed by interposing a core layer member 32 which includes the tensile body 14 between an unvulcanized top cover rubber member 33 and an unvulcanized bottom cover rubber member 34 in the belt thickness direction T as shown in FIG. 5.

Note that the core layer member 32 further includes unvulcanized adhesive rubber sheets 32a. The adhesive rubber sheets 32a are provided in pair, and has the tensile body 14 interposed therebetween in the belt thickness direction T.

The bottom cover rubber member 34 is formed of an unvulcanized rear rubber sheet 34a.

Note that, although the bottom cover rubber member 34 is formed with a single rear rubber sheet 34a in the illustrated example, it is not limited thereto, and may be formed by laminating a plurality of layers of bottom rubber sheets.

The top cover rubber member 33 includes an unvulcanized first cover rubber part 36 and unvulcanized second cover rubber parts 37.

The front and bottoms of the first cover rubber part 36 facing the belt thickness direction T extend in both directions which are the belt length direction L and the belt width direction W. Ends of the first cover rubber part 36 in the belt length direction L are formed in a staircase shape in which stairs gradually ascend from the outer side to the inner side of the belt length direction L as they lead from the core layer member side to the surface of the top cover rubber in the belt thickness direction T.

The first cover rubber part 36 has the detection object 15 embedded therein. The size of the first cover rubber part 36 in the belt thickness direction T is equal to the size of the detection object 15 in the belt thickness direction T, and both ends of the detection object 15 in the belt length direction L are separately exposed from the front and bottoms of the first cover rubber part 36. The detection object 15 is embedded throughout the whole length of the first cover rubber part 36 in the belt width direction W, and the first cover rubber part 36 is divided into a pair of divided rubber bodies 36a by the detection object 15 in the belt length direction L. The detection object 15 is sandwiched between the divided rubber bodies 36a in the belt length direction L.

The second cover rubber parts 37 are provided in a pair with the first cover rubber part 36 interposed therebetween in the belt length direction L. The size of the first cover rubber part 36 in the belt thickness direction T is set to be equal to the size of the second cover rubber parts 37 in the belt thickness direction T. The size of the first cover rubber part 36 in the belt width direction W is also set to be equal to the size of the second cover rubber parts 37 in the belt width direction W.

Ends of the second cover rubber parts 37 in the belt length direction L are connected with the ends of the first cover rubber part 36 in the belt length direction L. The ends of the second cover rubber parts 37 in the belt length direction L correspond to the ends of the first cover rubber part 36 in the belt length direction L, and are formed in a staircase shape in which stairs gradually ascend from the outer side to the inner side of the belt length direction L as they lead from the core layer member side to the surface of the top cover rubber in the belt thickness direction T.

The second cover rubber parts 37 each include a plurality of top rubber sheets 37a that are laminated in the belt thickness direction T. The thickness of each top rubber sheet 37a is set to be equal to the size of each stair in the belt thickness direction T at each end of the first cover rubber part 36 in the belt length direction L. The ends of the top rubber sheets 37a in the belt length direction L are connected with stair end faces 36b facing the belt length direction L at the ends of the first cover rubber part 36 in the belt length direction L.

Note that, although each second cover rubber part 37 is formed with three top rubber sheets 37a in the illustrated example, it is not limited thereto, and may be formed with two or fewer top rubber sheets 37a, or four or more top rubber sheets 37a.

The adhesive rubber sheets 32a have a satisfactory adhesion property with respect to the tensile body 14, and can adhere to the top cover rubber member 33 and the bottom cover rubber member 34 through vulcanization. On the other hand, the rear rubber sheet 34a, the first cover rubber part 36, and the second cover rubber parts 37 have excellent abrasion resistance and cutting resistance in comparison to the adhesive rubber sheets 32a.

The adhesive rubber sheets 32a, the rear rubber sheet 34a, the first cover rubber part 36, and the second cover rubber parts 37 may contain, for example, natural rubber (NR), butadiene rubber (BR), styrene-butadiene rubber (SBR), acrylonitrile-butadiene rubber (NBR), isoprene rubber (IR), chloroprene rubber (CR), or the like or a mixture of two or more of them as a common main component.

Here, the laminated body formation step has a member formation step of forming the top cover rubber member 33 by separately connecting both ends of the first cover rubber part 36 in the belt length direction L with the ends of the second cover rubber parts 37 in the belt length direction L as illustrated in FIGS. 5 to 9.

Figure 6:
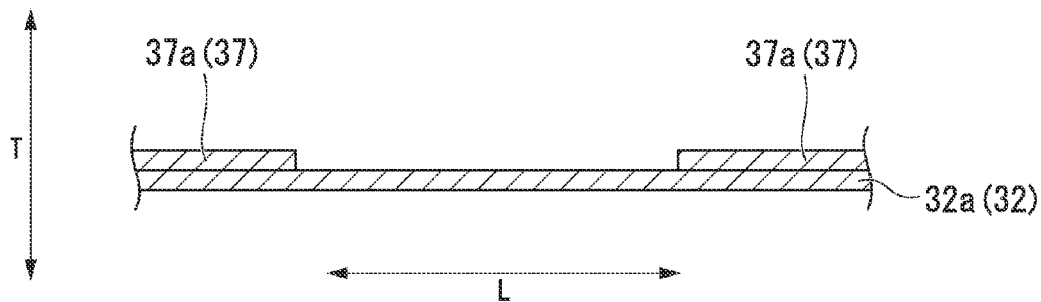
FIG. 6 is an illustrative diagram of the manufacturing method of a finite conveyor belt according to the first embodiment of the present invention.

In this step, the core layer member 32 illustrated in FIG. 6 is first disposed on a work table that is not illustrated. Note that, although the adhesive rubber sheet 32a of the core layer member 32 is disposed on the work table in the illustrated example, the entire core layer member 32 may be disposed on the work table.

Then, among the plurality of top rubber sheets 37a of each of the pair of second cover rubber parts 37, those that are positioned closest to the core layer member side in the belt thickness direction T are separately disposed on the core layer member 32. At this time, both of the top rubber sheets 37a are disposed in the belt length direction L having a gap that has the same size as the bottom of the first cover rubber part 36 in the belt length direction L therebetween.

Figure 7:
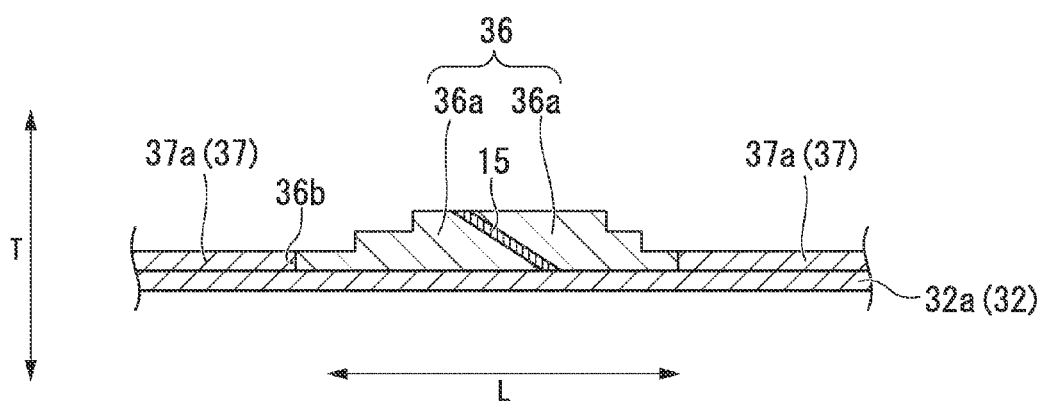
FIG. 7 is an illustrative diagram of the manufacturing method of a finite conveyor belt according to the first embodiment of the present invention.

Next, the first cover rubber part 36 is disposed on the core layer member 32 as illustrated in FIG. 7. At this time, the first cover rubber part 36 is disposed between the top rubber sheets 37a, and the stair end faces 36b facing the belt length direction L are connected with the ends of the top rubber sheets 37a in the belt length direction L at the ends of the first cover rubber part 36 in the belt length direction L.

Figure 8:
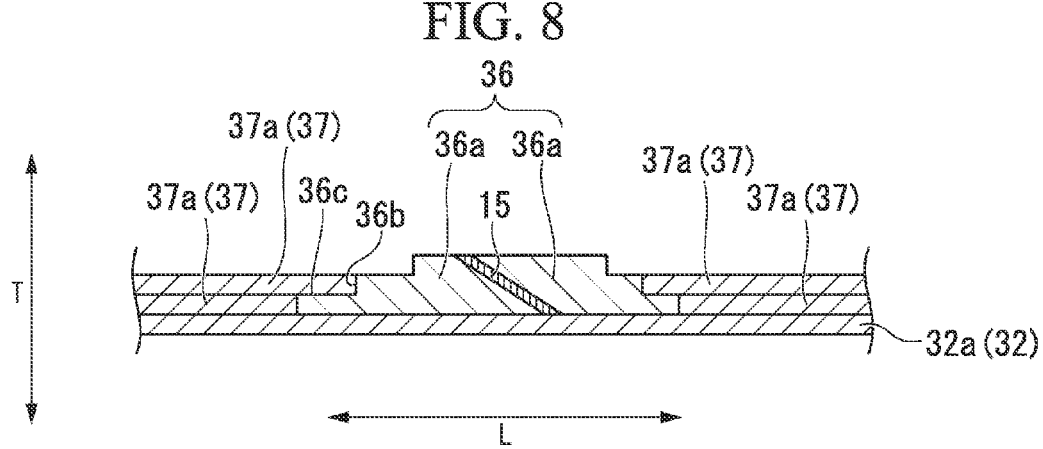
FIG. 8 is an illustrative diagram of the manufacturing method of a finite conveyor belt according to the first embodiment of the present invention.
Figure 9:
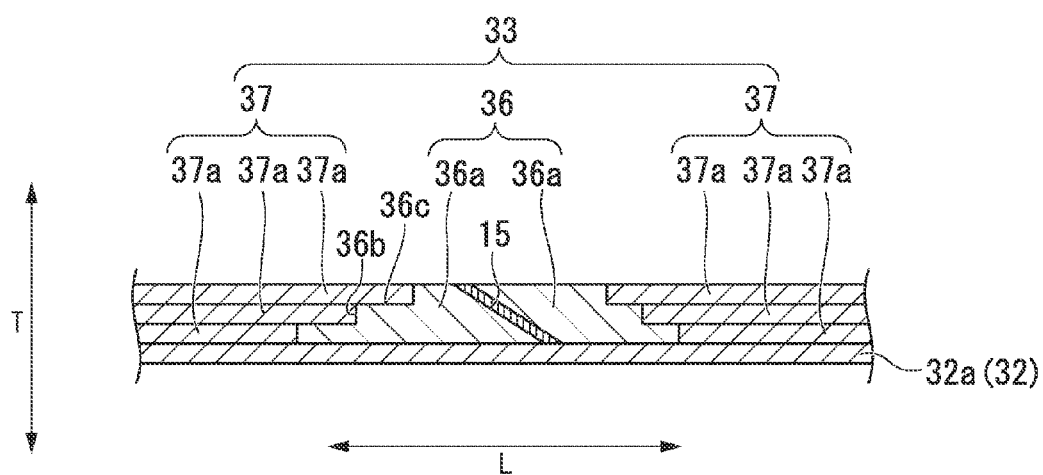
FIG. 9 is an illustrative diagram of the manufacturing method of a finite conveyor belt according to the first embodiment of the present invention.

Then, by laminating the top rubber sheets 37a on the core layer member 32 while connecting the ends of the top rubber sheets 37a in the belt length direction L with the stair end faces 36b facing the belt length direction L at the ends of the first cover rubber part 36 in the belt length direction L, the second cover rubber parts 37 are disposed on the core layer member 32 as illustrated in FIGS. 8 and 9. At this time, the ends of the top rubber sheets 37a in the belt length direction L are also connected with stair main faces 36c which face the belt thickness direction T at the ends of the first cover rubber part 36 in the belt length direction L.

As described above, by disposing the second cover rubber parts 37 on the core layer member 32 while connecting the ends of the first cover rubber part 36 in the belt length direction L disposed on the core layer member 32 with the ends of the second cover rubber parts 37 in the belt length direction L, the top cover rubber member 33 is formed in this member formation step.

Then, after the laminated body formation step, a vulcanization step in which the laminated body 35 shown in FIG. 5 is pressurized in the belt thickness direction T and heated to be vulcanized is executed. Accordingly, the adhesive rubber sheets 32a, the top cover rubber member 33, and the bottom cover rubber member 34 are vulcanized to become the finite top cover rubber part 31, and thereby the finite conveyor belt 30 is formed.

The finite conveyor belt 30 is formed in, for example, a factory or the like, and at the time of factory shipment, the tensile body 14 is embedded inside the finite top cover rubber part 31 throughout its whole length. Accordingly, for example, damage, corrosion, or the like of the tensile body 14 is suppressed.

Next, a manufacturing method of an endless conveyor belt for forming the endless conveyor belt 11 with the finite conveyor belt 30 will be described. In this method, by joining the ends of the finite conveyor belt 30 in the belt length direction L to each other, the endless conveyor belt 11 is formed. This method is implemented after, for example, the finite conveyor belt 30 formed in a factory is transported to an installation site in which the endless conveyor belt 11 will be used.

In this method, first, an exposure step in which the tensile body 14 is exposed at the ends of the finite conveyor belt 30 in the belt length direction L is executed. Note that the tensile body 14 may be fully exposed, or the finite top cover rubber part 31 may be partially left on the surface of the tensile body 14 and a rubber layer formed of a material constituting the finite top cover rubber part 31 may be formed throughout the entire surface of the tensile body 14.

Figure 10:
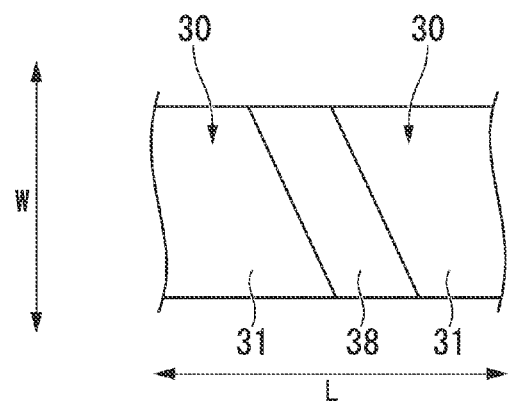
FIG. 10 is an illustrative diagram of a joining method of a finite conveyor belt according to the first embodiment of the present invention.

Then, a joining step of joining the ends of the finite conveyor belt 30 in the belt length direction L is executed by vulcanizing an unvulcanized joining rubber member 38 by pressurizing in the belt thickness direction T and heating the joining rubber member 38 in a state in which the ends of the finite conveyor belt 30 in the belt length direction L are superimposed and the tensile body 14 exposed at the ends is disposed inside the joining rubber member 38 as illustrated in FIG. 10. At this time, the joining rubber member 38 is vulcanized using, for example, a vulcanizer that is not illustrated transported to the installation site.

Then, by joining all ends of the finite conveyor belt 30 in the belt length direction L which are adjacent to each other in the belt length direction L, the endless conveyor belt 11 is formed.

Note that, as illustrated in FIG. 10, during the exposure step, the tensile body 14 is exposed by removing the finite top cover rubber part 31 so that the end edges of the finite top cover rubber part 31 in the belt length direction L extend in a direction in which the end edges incline in the belt length direction L and the belt width direction W in the planar view, and during the joining step, the joining rubber member 38 can be easily vulcanized by setting the size of the joining rubber member 38 in the belt length direction L to be no more than a fixed upper limit value while the joining rubber member 38 is formed to be a parallelogram that is long in the inclined direction.

According to the manufacturing method of a finite conveyor belt, the joining method of a finite conveyor belt, a manufacturing method of an endless conveyor belt, and the conveyor belt apparatus 10 relating to the present embodiment described above, the top cover rubber member 33 is formed by separately connecting both ends of the unvulcanized first cover rubber part 36 in the belt length direction L with the ends of the unvulcanized second cover rubber parts 37 in the belt length direction L during the member formation step. Thus, by vulcanizing the laminated body 35 which includes this top cover rubber member 33 through application of pressure in the belt thickness direction T and heating during the vulcanization step, the detection object 15 can be embedded in the finite top cover rubber part 31 rather than in the joining rubber member 38. Thus, as the detection processing means 12 detects the detection object 15 and the amount of abrasion T1 of the top 13a of the endless top cover rubber part 13 is obtained based on the result of the detection, the amount of abrasion T1 of the main body portion of the endless top cover rubber part 13 can be obtained with high accuracy.

In addition, since the detection object 15 can be embedded in the finite top cover rubber part 31 rather than in the joining rubber member 38 as described above, the shape of the joining rubber member 38 can be designed regardless of the shape of the detection object 15. Accordingly, for example, the joining rubber member 38 can be designed to be a shape which enables easy vulcanization while the detection object 15 can be shaped to be easily detected by the detection processing means 12.

Note that, in a joining method of a finite conveyor belt in which a detection object is embedded in a joining rubber member, it is necessary to design a shape of the joining rubber member according to a shape of the detection object, different from the joining method of a finite conveyor belt described above. For this reason, when the joining rubber member is shaped to be a parallelogram that is long in the inclined direction while the detection object is shaped to be a rectangle that is long in the belt width direction in the planar view in the present embodiment, there are cases in which the size of the joining rubber member in the belt length direction should be greater than the upper limit value so that the rectangular shape of the detection object is positioned inside the parallelogram shape of the joining rubber member. In such cases, it is necessary to increase the number of vulcanizers to be used in the joining step or increase the size of the vulcanizer, which requires extra work for vulcanization of the joining rubber member.

According to the joining method of a finite conveyor belt of the present embodiment, however, since the detection object 15 can be embedded in the finite top cover rubber part 31 rather than in the joining rubber member 38 as described above, the shape of the joining rubber member 38 can be designed regardless of the shape of the detection object 15. Accordingly, the size of the joining rubber member 38 in the belt length direction L need not be excessively increased, and can be set to be no greater than the upper limit value, and thus the joining rubber member 38 can be easily and reliably vulcanized.

In addition, during the member formation step, by disposing the second cover rubber parts 37 on the core layer member 32 while connecting the ends of the first cover rubber part 36 in the belt length direction L that has been disposed on the core layer member 32 with the ends of the second cover rubber parts 37 in the belt length direction L, the top cover rubber member 33 is formed on the core layer member 32. Thus, the second cover rubber parts 37 can be easily disposed on the core layer member 32 while their positions with respect to the first cover rubber part 36 are adjusted with high accuracy, and thereby the finite conveyor belt 30 can be manufactured with high accuracy.

In addition, during the member formation step, by laminating the top rubber sheets 37a on the core layer member 32 while connecting the ends of the top rubber sheets 37a in the belt length direction L with the stair end faces 36b at the end of the first cover rubber part 36 in the belt length direction L, the second cover rubber parts 37 are disposed on the core layer member 32. Thus, the top rubber sheets 37a can be easily laminated on the core layer member 32 while their positions with respect to the first cover rubber part 36 are adjusted with high accuracy, and thereby the finite conveyor belt 30 can be manufactured with higher accuracy.

Note that, although those that are positioned closest to the core layer member side in the belt thickness direction T among the plurality of top rubber sheets 37a of each of the pair of second cover rubber parts 37 are disposed separately on the core layer member 32 and then the first cover rubber part 36 is set to be disposed on the core layer member 32 during the member formation step in the present embodiment, the order of disposition is not limited thereto. For example, after the first cover rubber part is disposed on the core layer member, the plurality of top rubber sheets of each of the pair of second cover rubber parts may be laminated on the core layer member.

Figure 11:
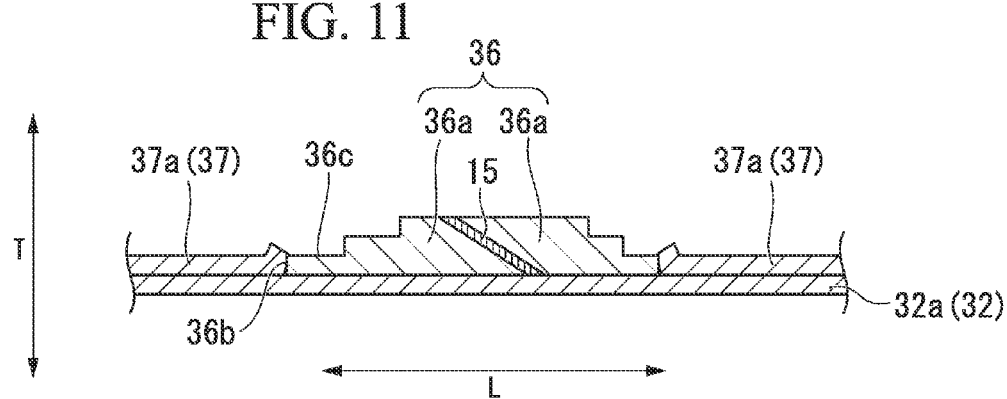
FIG. 11 is an illustrative diagram of the manufacturing method of a finite conveyor belt according to the first embodiment of the present invention.

In addition, when the top rubber sheets 37a are laminated on the core layer member 32 while the ends of the top rubber sheets 37a are connected in the belt length direction L with the stair end faces 36b at the ends of the first cover rubber part 36 in the belt length direction L, some of the ends of the top rubber sheets 37a in the belt length direction L may be caused to go up to the stair main faces 36c at the end of the first cover rubber part 36 in the belt length direction L as illustrated in FIG. 11. Accordingly, adhesion defects of the joining parts of the first cover rubber part 36 and the second cover rubber parts 37 can be prevented.

Second Embodiment

Next, a manufacturing method of a finite conveyor belt according to a second embodiment of the present invention will be described.

Note that, in this second embodiment, the same reference numerals are given to the same constituent elements as those of the first embodiment and description thereof is omitted, and only differences between the embodiments will be described.

Figure 12:
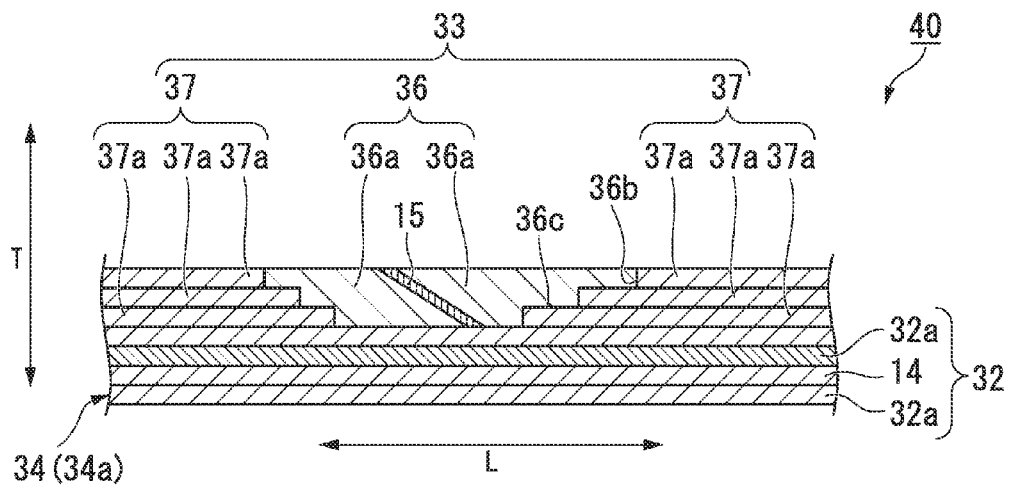
FIG. 12 is an illustrative diagram of a manufacturing method of a finite conveyor belt according to a second embodiment of the present invention.

In the manufacturing method of a finite conveyor belt according to the present embodiment, the ends of the first cover rubber part 36 in the belt length direction L are formed in a staircase shape in which stairs gradually descend from the inner side to the outer side of the belt length direction L as they lead from the core layer member side to the surface of the top cover rubber in the belt thickness direction T in laminated body 40 as illustrated in FIG. 12.

The ends of the second cover rubber parts 37 in the belt length direction L correspond to the ends of the first cover rubber part 36 in the belt length direction L having the staircase shape in which the stairs gradually descend from the inner side to the outer side of the belt length direction L as they lead from the core layer member side to the surface of the top cover rubber in the belt thickness direction T.

Figure 13:
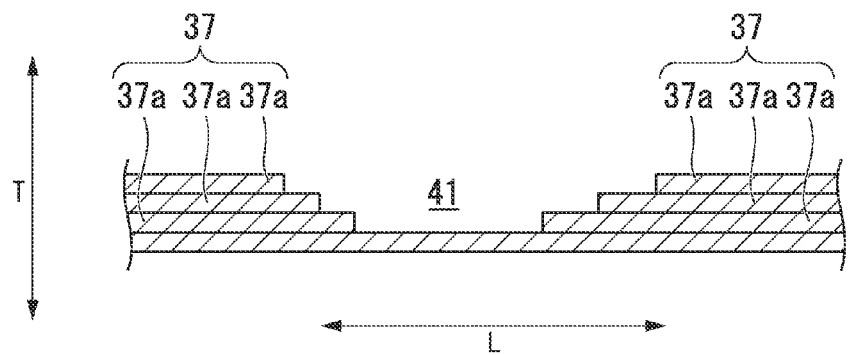
FIG. 13 is an illustrative diagram of a manufacturing method of a finite conveyor belt according to the second embodiment of the present invention.

In addition, the plurality of top rubber sheets 37a of each of the pair of second cover rubber parts 37 are separately disposed on the core layer member 32 during the member formation step, and thereby the pair of second cover rubber parts 37 are disposed on the core layer member 32 as illustrated in FIG. 13. At this time, the pair of second cover rubber parts 37 are disposed so that a disposition space 41 in which the first cover rubber part 36 is disposed is provided between the pair of second cover rubber parts 37.

Then, by disposing the first cover rubber part 36 in the disposition space 41 while connecting the ends of the first cover rubber part 36 in the belt length direction L with the ends of the second cover rubber parts 37 in the belt length direction L as illustrated in FIG. 12, the top cover rubber member 33 is formed.

According to the manufacturing method of a finite conveyor belt of the present embodiment, by disposing the first cover rubber part 36 in the disposition space 41 while connecting the end of the first cover rubber part 36 in the belt length direction L with the ends of the second cover rubber parts 37 in the belt length direction L during the member formation step as described above, the top cover rubber member 33 is formed. Thus, the first cover rubber part 36 can be easily disposed on the core layer member 32 while its position with respect to the second cover rubber parts 37 is adjusted with high accuracy, and thereby the finite conveyor belt 30 can be manufactured with high accuracy.

Third Embodiment

Next, a manufacturing method of a finite conveyor belt according to a third embodiment of the present invention will be described.

Note that, in this third embodiment, the same reference numerals are given to the same constituent elements as those of the second embodiment and description thereof is omitted, and only differences of the embodiments will be described.

Figure 14:
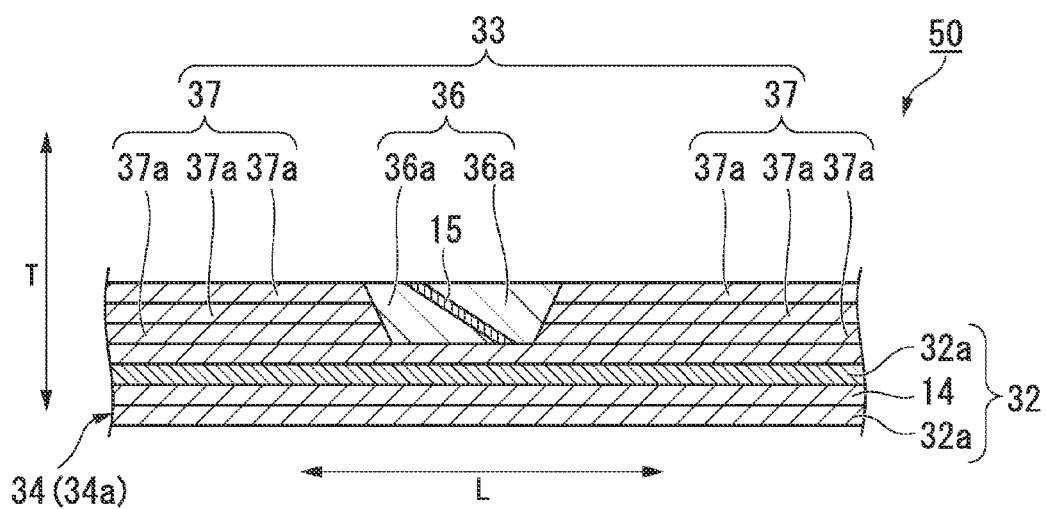
FIG. 14 is an illustrative diagram of a manufacturing method of a finite conveyor belt according to a third embodiment of the present invention.

In the manufacturing method of a finite conveyor belt according to the present embodiment, in a laminated body 50, the ends of the first cover rubber part 36 in the belt length direction L are formed in an inclining face shape in which the face gradually inclines from the inner side to the outer side of the belt length direction L as it goes from the core layer member side to the surface of the top cover rubber in the belt thickness direction T as illustrated in FIG. 14.

The ends of the second cover rubber parts 37 in the belt length direction L correspond to the ends of the first cover rubber part 36 in the belt length direction L, having the inclining face shape in which the face gradually inclines from the inner side to the outer side of the belt length direction L as it goes from the core layer member side to the surface of the top cover rubber in the belt thickness direction T.

Figure 15:
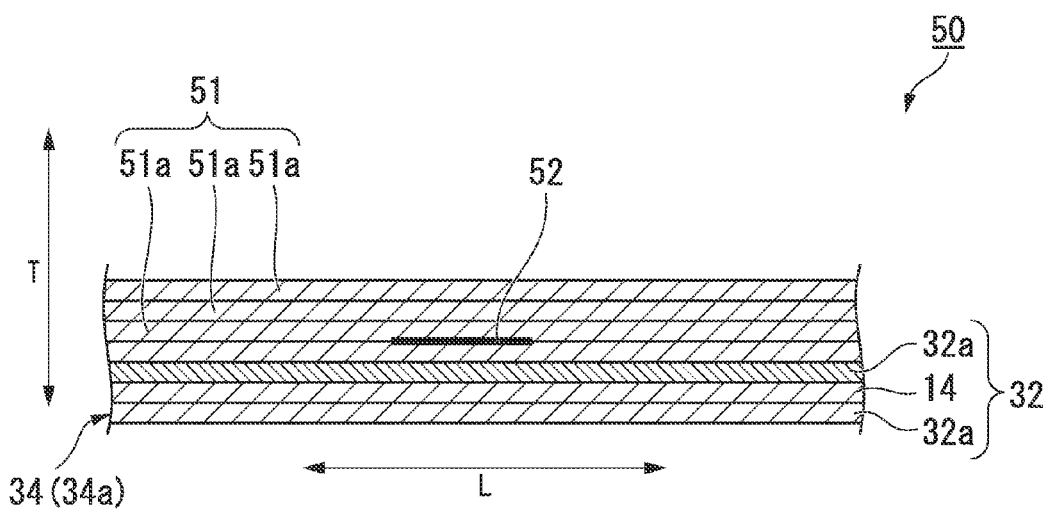
FIG. 15 is an illustrative diagram of a manufacturing method of a finite conveyor belt according to the third embodiment of the present invention.

Then, a forming body formation step of forming on the core layer member 32 an unvulcanized second cover rubber part 51 disposed on the core layer member 32 as illustrated in FIG. 15 is performed during the member formation step.

The second cover rubber part 51 includes a plurality of unvulcanized top rubber sheet forming bodies 51a that are laminated in the belt thickness direction T. During this forming body formation step, a separable sheet 52 is disposed between the second cover rubber part 51 and the core layer member 32. In this case, the separable sheet 52 is disposed in a limited range between a portion of the second cover rubber part 51 to be removed during a removal step to be described below and the core layer member 32. Note that the separable sheet 52 may not be disposed.

Figure 16:
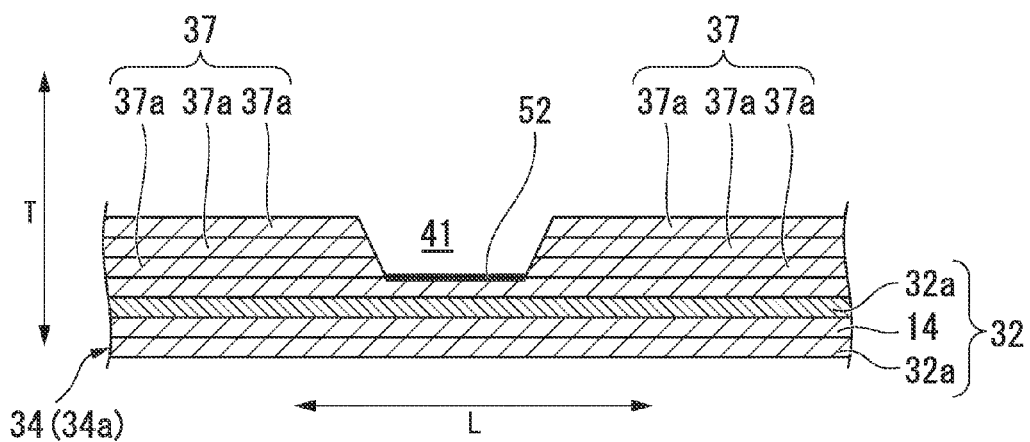
FIG. 16 is an illustrative diagram of a manufacturing method of a finite conveyor belt according to the third embodiment of the present invention.

Next, the removal step in which the second cover rubber parts 37 and the disposition space 41 are formed on the core layer member 32 by removing a part of the second cover rubber part 51 as illustrated in FIG. 16 is performed. At this time, respective portions of the second cover rubber part 51 that are positioned on both outer sides of the separable sheet 52 in the belt length direction L are cut in the belt thickness direction T, and the portion of the second cover rubber part 51 positioned between the cut faces formed through the cutting is removed along with the separable sheet 52.

Then, by disposing the first cover rubber part 36 in the disposition space 41 while connecting the ends of the first cover rubber part 36 in the belt length direction L with the ends of the second cover rubber parts 37 in the belt length direction L as illustrated in FIG. 14, the top cover rubber member 33 is formed.

According to the manufacturing method of a finite conveyor belt of the present embodiment described above, since the second cover rubber parts 37 and the disposition space 41 are formed on the core layer member 32 by removing the part of the second cover rubber part 51 disposed on the core layer member 32 during the member formation step, the second cover rubber parts 37 and the disposition space 41 can be formed with ease.

Note that the technical scope of the present invention is not limited to the above-described embodiments, and can be variously modified within the scope not departing from the gist of the present invention.

For example, the scraper 21a, the width-direction guide 22, and the thickness-direction guide 23 may not be provided. Furthermore, for example, the processing unit 17 is not limited to the configuration shown in the embodiments.

In addition, during the exposure step, the finite top cover rubber part 31 may be removed so that the end edges of the finite top cover rubber part 31 in the belt length direction L extend in the direction in which the end edges incline in the belt length direction L and the belt width direction W.

Furthermore, during the joining step, the size of the joining rubber member 38 in the belt length direction L may be set to be greater than the fixed upper limit value while the joining rubber member 38 is formed in a parallelogram shape that is long in the inclined direction.

In addition, although the detection unit 16 is set to be disposed at the return start position in the above-described embodiments, the present invention is not limited thereto. For example, the detection unit may be disposed to face a surface of the carrier-side portion of the endless conveyor belt.

In addition, although the detection object 15 is set to extend throughout the whole length of the endless top cover rubber part 13 in the belt width direction W in the above-described embodiments, the present invention is not limited thereto.

Furthermore, although the detection object 15 is set to be formed in a rectangular shape that is long in the belt width direction W in the planar view in the above-described embodiment, the present invention is not limited thereto.

In addition, although the detection object 15 is set to be a plate-like magnet inclining to the bottom 13b of the endless top cover rubber part 13 in the planar view in the above-described embodiments, the present invention is not limited thereto. For example, the detection object may be configured by providing a plurality of magnet members in the detection object and disposing the plurality of magnet members in a staircase shape setting their positions different in the belt length direction and the belt thickness direction.

Figure 17:
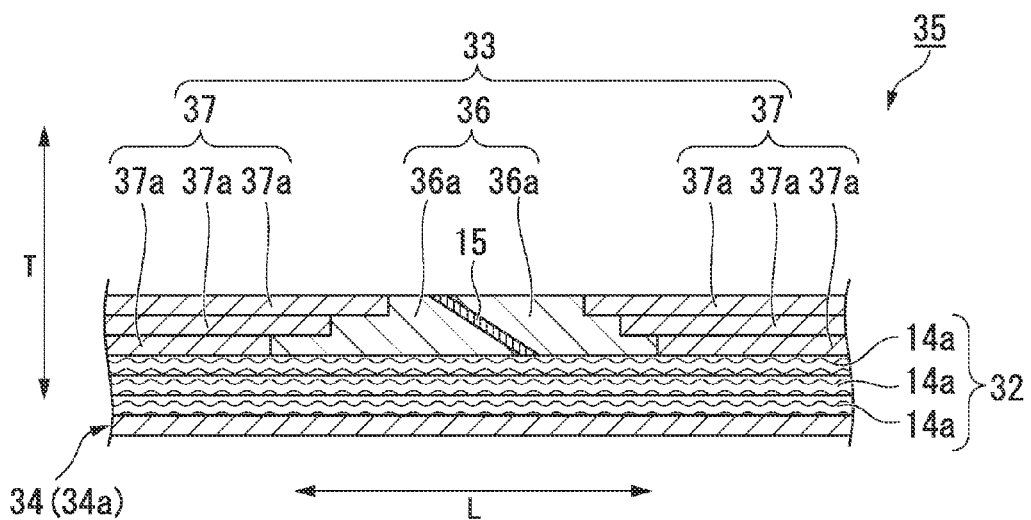
FIG. 17 is an illustrative diagram of a manufacturing method of a finite conveyor belt according to a modified example of the present invention.

In addition, although the steel cords extending in the belt length direction L are shown as the tensile body 14 in the above-described embodiment, instead, for example, organic fiber cords may be employed. As the organic fiber cords, for example, nylon, polyester, aramid, or the like is exemplified. Furthermore, a configuration in which sailcloth composed of nylon, polyester, aramid, or the like is coated with adhesive rubber as illustrated in, for example, FIG. 17 may be employed as the tensile body 14a. In addition, in order to prevent damage of the steel cords or organic fiber cords, sailcloth may be embedded together with the cords.

Further, a modified example of the manufacturing method of a finite conveyor belt will be described.

Figure 18:
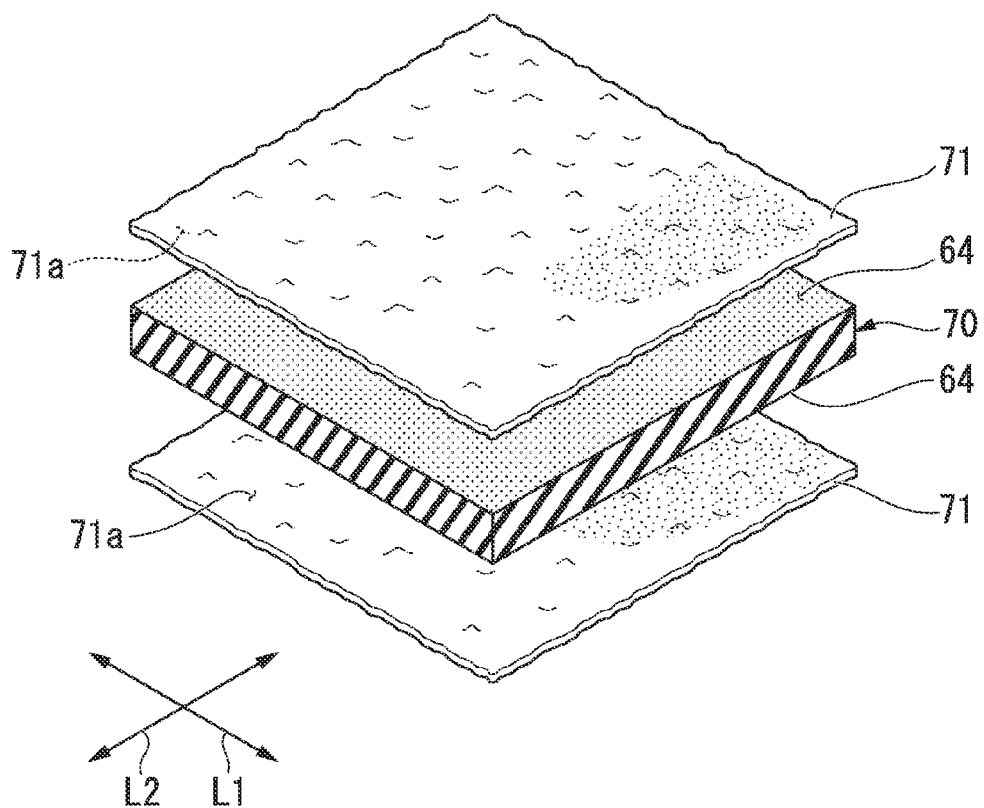
FIG. 18 is an illustrative diagram of the manufacturing method of a finite conveyor belt according to the modified example of the present invention and a perspective diagram showing a state just before a separable sheet is attached to an adhesion surface of an unvulcanized rubber magnet.

First, an unvulcanized rubber material into which a magnetic powder is incorporated (hereinafter referred to as an unvulcanized rubber magnet 70) is formed as illustrated in FIG. 18. Note that, in the illustrated example, the shape of the unvulcanized rubber magnet 70 is set to a square shape in a planar view in which the length thereof in a belt length direction L1 is substantially equal to the length thereof in a belt short-side direction L2 to simplify the drawing. The shape of the unvulcanized rubber magnet 70 may be appropriately changed.

Note that, since the unvulcanized rubber magnet 70 is not magnetized yet in this stage, it is a rubber piece formed of an unvulcanized rubber material into which a magnetic powder is incorporated.

Next, an attachment step of separably attaching separable sheets 71 illustrated in FIG. 18 to adhesive faces 64 of the unvulcanized rubber magnet 70 is performed.

These separable sheets 71 are sheets formed in, for example, square shapes in a planar view having the same size as the unvulcanized rubber magnet 70, and can be attached to all of the adhesive faces 64 of the unvulcanized rubber magnet 70. In addition, attachment faces 71a of the separable sheets 71 are roughened to have a plurality of convexities and concavities.

Figure 19:
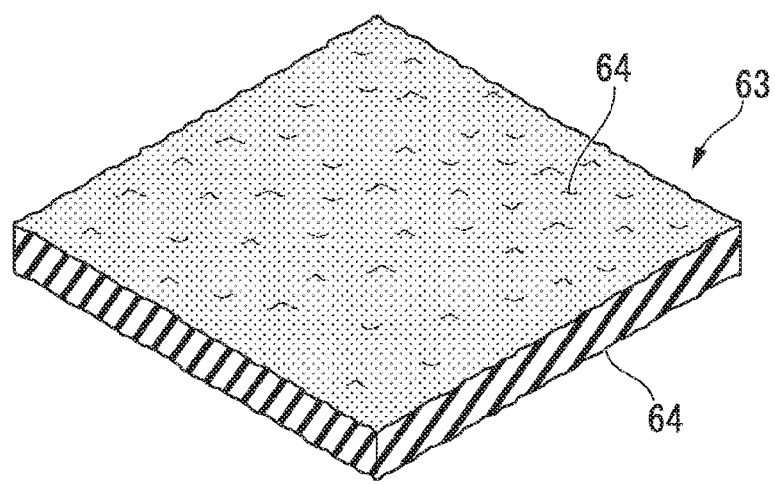
FIG. 19 is a perspective diagram showing a state in which vulcanization has been performed in the separable sheet-adhering state from the state shown in FIG. 18 and the separable sheet has been separated from the rubber magnet after the vulcanization.

Then, a first vulcanization step in which the unvulcanized rubber magnet 70 with the separable sheets 71, of which the adhesive faces 64 has the separable sheets 71 attached thereto, is vulcanized, then the separable sheets 71 are separated, and a vulcanized rubber magnet 63 having the roughness which has been transferred onto the adhesive faces 64 as illustrated in FIG. 19 is formed is performed.

In this step, since vulcanization is performed with the separable sheets 71 attached, the rubber magnet 63 is integrated with the separable sheets 71 and at the same time, the adhesive faces 64 of the rubber magnet 63 are roughened according to the attachment faces 71a of the separable sheets 71. Thus, only with simple work of separating the separable sheets 71 after vulcanization, the rubber magnet 63 having roughened faces through transferring of the adhesive faces 64 can be obtained.

Note that, prior to performing a second vulcanization step to be described below after the first vulcanization step described above is performed, magnetization is performed on the rubber magnet 63 to cause the rubber magnet to function as a magnet.

Figure 20:
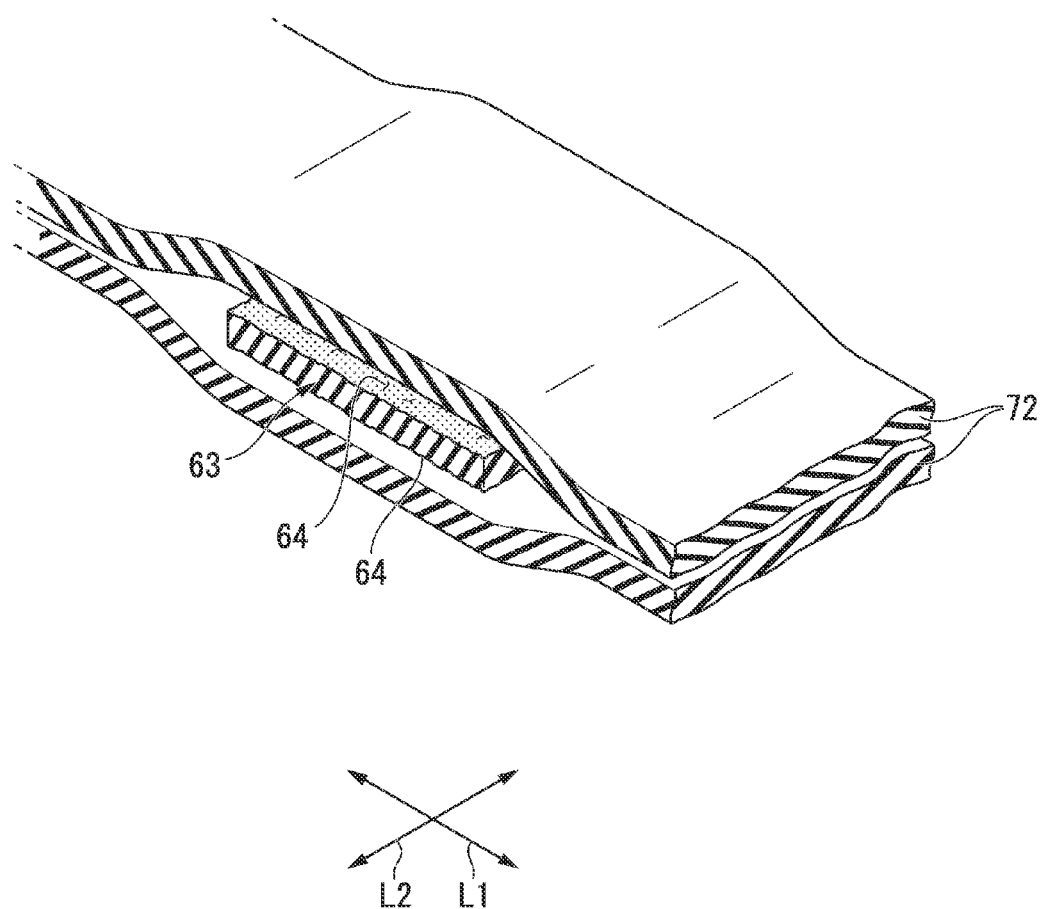
FIG. 20 is a perspective diagram showing the state in which the vulcanized rubber magnet has been inserted into an unvulcanized rubber belt from the state shown in FIG. 19.

Next, the second vulcanization step in which unvulcanized rubber belts (hereinafter referred to as unvulcanized rubber belts 72) are laminated on the adhesive faces 64 of the vulcanized rubber magnet 63 with the rubber magnet 63 interposed therebetween as illustrated in FIG. 20 and then the unvulcanized rubber belts 72 are vulcanized is performed.

In this step, a strip-like rubber belt 62 in which the rubber magnet 63 is embedded can be formed, and it can be cut by an arbitrary length, and then both ends thereof in the belt length direction L1 are connected with each other, thereby obtaining the conveyor belt apparatus illustrated in FIG. 1.

According to the manufacturing method of the present embodiment described above, since the unvulcanized rubber magnet 70 is vulcanized first and then the rubber magnet 63 is formed, the rubber material does not flow as easily as when the unvulcanized rubber magnet is vulcanized together with the unvulcanized rubber belts 72, and thus deterioration in expected performance can be suppressed. That is to say, a reduction in magnetic force caused by its dispersion due to its fluidity can be suppressed. Accordingly, the rubber magnet 63 which produces desired magnetic force can be obtained.

Therefore, a high-quality conveyor belt apparatus which easily exhibits sufficient magnetic force of the rubber magnet 63 can be obtained.

In addition, since the unvulcanized rubber belts 72 are vulcanized after the unvulcanized rubber belts 72 are laminated on the adhesive faces 64 of the rubber magnet 63 with the rubber magnet 63 interposed therebetween, the rubber material of the unvulcanized rubber belts 72 can be caught on the roughened adhesive faces 64, and thus adhesion force of the interface between the rubber magnet 63 and the rubber belt 62 can be enhanced.

Therefore, separation of the interface between the rubber magnet 63 and the rubber belt 62 can be prevented, and a conveyor belt with sufficient reliability to be continuously used over a long period of time without problem can be obtained.

Note that the adhesion force is enhanced approximately 1.5 to 2 times more than when the adhesive faces 64 are smooth faces.

In addition, the constituent elements of the above-described embodiments can be appropriately replaced with known constituent elements in the range not departing from the gist of the present invention, and the modified example described above may be appropriately combined.

INDUSTRIAL APPLICABILITY

According to the conveyor belt apparatus of the present invention, an amount of abrasion of the main body portion of the endless top cover rubber part can be obtained with high accuracy.

DESCRIPTION OF REFERENCE SIGNS

10 Conveyor belt apparatus
11 Endless conveyor belt
12 Detection processing means
13 Endless top cover rubber part
13a Top
13b Bottom
14, 14a Tensile body
15 Detection object
30 Finite conveyor belt
31 Finite top cover rubber part
32 Core layer member
32a Adhesive rubber sheet
33 Top cover rubber member
34 Bottom cover rubber member
34a Rear rubber sheet
35, 40, 50 Laminated body
36 First cover rubber part
36b Stair end face
37 Second cover rubber part
37a Top rubber sheet
38 Joining rubber member
41 Disposition space
51 Second cover rubber part
51a Top rubber sheet forming body
62 Rubber belt
63 Rubber magnet (embedded rubber)
64 Adhesive face of embedded rubber
70 Unvulcanized rubber magnet
71 Separable sheet
71a Attachment face of the separable sheet
72 Unvulcanized rubber belt

The invention claimed is:

1. A manufacturing method of a finite conveyor belt in which, in a finite top cover rubber part in which a tensile body is embedded, a detection object which is abraded according to an amount of abrasion of a surface of the finite top cover rubber part is embedded in a portion positioned on the top surface side rather than on the tensile body side, the method comprising:
   a laminated body formation step of forming a laminated body in which a core layer member which includes the tensile body is interposed between an unvulcanized top cover rubber member and an unvulcanized bottom cover rubber member in a belt thickness direction; and
   a vulcanization step of vulcanizing the laminated body by pressuring in the belt thickness direction and heating the laminated body to form the finite conveyor belt,
   wherein the laminated body formation step includes a member formation step of forming the top cover rubber member by separately connecting both ends of an unvulcanized first cover rubber part in a belt length direction in which the detection object is embedded with ends of unvulcanized second cover rubber parts in the belt length direction, wherein the detection object is a vulcanized rubber magnet and has a roughened surface.

2. The manufacturing method of a finite conveyor belt according to claim 1, wherein, during the member formation step, by disposing the second cover rubber part on the core layer member while connecting the ends of the first cover rubber part in the belt length direction that has been disposed on the core layer member with the ends of the second cover rubber parts in the belt length direction, the top cover rubber member is formed on the core layer member.

3. The manufacturing method of a finite conveyor belt according to claim 2, wherein the ends of the first cover rubber part in the belt length direction are formed in a staircase shape in which stairs gradually ascend from the outer side to the inner side of the belt length direction as the stairs lead from a core layer member side to the opposite side of the core layer member in the belt thickness direction, wherein the second cover rubber parts each include a plurality of top rubber sheets laminated in the belt thickness direction, wherein a thickness of each of the top rubber sheets is equal to a size of each stair in the belt thickness direction at each end of the first cover rubber part in the belt length direction, and wherein, during the member formation step, by laminating the top rubber sheets on the core layer member while connecting ends of the top rubber sheets in the belt length direction with stair end faces facing the belt length direction at the ends of the first cover rubber part in the belt length direction, the second cover rubber parts are disposed on the core layer member.

4. The manufacturing method of a finite conveyor belt according to claim 1, wherein, during the member formation step, the top cover rubber member is formed by disposing the first cover rubber part in a disposition space which is provided between the second cover rubber parts that are disposed on the core layer member neighboring each other in the belt length direction while connecting the ends of the first cover rubber part in the belt length direction with the ends of the second cover rubber parts in the belt length direction.

5. The manufacturing method of a finite conveyor belt according to claim 4, wherein, during the member formation step, the second cover rubber parts and the disposition space are formed on the core layer member by removing a part of the unvulcanized second cover rubber parts disposed on the core layer member.

6. The manufacturing method of a finite conveyor belt according to claim 1, the roughening is performed by performing vulcanization in a state in which a rough-surfaced separable sheet is attached to an unvulcanized rubber magnet.

7. A joining method of a finite conveyor belt for joining ends of a finite conveyor belt manufactured using the manufacturing method of a finite conveyor belt according to claim 1 in a belt length direction, the method comprising:

an exposure step of causing the tensile body to be exposed at the ends of the finite conveyor belt in the belt length direction; and a joining step of vulcanizing an unvulcanized joining rubber member by pressurizing in a belt thickness direction and heating the joining rubber member in a state in which the ends of the finite conveyor belt in the belt length direction are superimposed and the tensile body exposed at the ends is disposed inside the joining rubber member.

8. The manufacturing method of a finite conveyor belt according to claim 1, wherein the separable sheet has surface roughness Ra of the attachment surface of 1 to 5000 μm.

9. A manufacturing method of an endless conveyor belt in which, in an endless top cover rubber part in which a tensile body is embedded, a detection object which is abraded according to an amount of abrasion of a surface of the endless top cover rubber part is embedded in a portion positioned on the top surface side rather than on the tensile body side, wherein the endless conveyor belt is formed by joining ends of a finite conveyor belt in a belt length direction to each other in which, in a finite top cover rubber part in which a tensile body is embedded, a detection object which is abraded according to an amount of abrasion of a surface of the finite top cover rubber part is embedded in a portion positioned on the top surface side rather than on the tensile body side, the method comprising:

a laminated body formation step of forming a laminated body in which a core layer member which includes the tensile body is interposed between an unvulcanized top cover rubber member and an unvulcanized bottom cover rubber member in a belt thickness direction; and a vulcanization step of vulcanizing the laminated body by pressuring in the belt thickness direction and heating the laminated body to form the finite conveyor belt, wherein the laminated body formation step includes a member formation step of forming the top cover rubber member by separately connecting both ends of an unvulcanized first cover rubber part in a belt length direction in which the detection object is embedded with ends of unvulcanized second cover rubber parts in the belt direction, wherein the detection object is a vulcanized rubber magnet and has a roughened surface, the method comprising:

an exposure step of causing the tensile body to be exposed at the ends of the finite conveyor belt in the belt length direction; and a joining step of vulcanizing an unvulcanized joining rubber member by pressuring in a belt thickness direction and heating the joining rubber member in a state in which the ends of the finite conveyor belt in the belt length direction are superimposed and the tensile body exposed at the ends is disposed inside the joining rubber member.

* * * * *